(12) United States Patent
Lim et al.

(10) Patent No.: US 8,472,401 B2
(45) Date of Patent: Jun. 25, 2013

(54) RELAY STATION AND METHOD OF OPERATING RELAY STATION IN MULTI-HOP COMMUNICATION SYSTEM

(75) Inventors: Sung Gook Lim, Bucheon-si (KR); Jung Min So, Suwon-si (KR); Mi Sun Do, Suwon-si (KR); Jai Yong Lee, Seoul (KR)

(73) Assignees: Samsung Electronics Co., Ltd., Suwon-si (KR); Industry-Academy Cooperation Foundation, Yonsei University, Seoul (KR)

( * ) Notice: Subject to any disclaimer, the term of this patent is extended or adjusted under 35 U.S.C. 154(b) by 1261 days.

(21) Appl. No.: 12/264,284

(22) Filed: Nov. 4, 2008

(65) Prior Publication Data

US 2009/0252078 A1 Oct. 8, 2009

(30) Foreign Application Priority Data

Apr. 3, 2008 (KR) .................. 10-2008-0031275

(51) Int. Cl.
*H04W 4/00* (2009.01)
*H04L 12/28* (2006.01)
*H04L 12/56* (2006.01)
*H04J 3/16* (2006.01)
*H04W 36/00* (2009.01)

(52) U.S. Cl.
USPC ...... 370/331; 370/395.21; 370/400; 370/468; 455/436

(58) Field of Classification Search
None
See application file for complete search history.

(56) References Cited

U.S. PATENT DOCUMENTS

| | | | |
|---|---|---|---|
| 2005/0286416 A1* | 12/2005 | Shimonishi et al. | 370/229 |
| 2006/0227724 A1 | 10/2006 | Thubert et al. | |
| 2007/0101015 A1 | 5/2007 | Larsson et al. | |
| 2007/0104148 A1* | 5/2007 | Kang et al. | 370/331 |
| 2007/0291663 A1 | 12/2007 | Dixit et al. | |
| 2008/0188231 A1* | 8/2008 | Zhu et al. | 455/450 |
| 2008/0267110 A1* | 10/2008 | Cai et al. | 370/315 |

FOREIGN PATENT DOCUMENTS

| | | |
|---|---|---|
| JP | 2004-208289 A | 7/2004 |
| KR | 10-2007-0042101 A | 4/2007 |
| KR | 10-2007-0061253 A | 6/2007 |

* cited by examiner

*Primary Examiner* — Chirag Shah
*Assistant Examiner* — Ashley Shivers
(74) *Attorney, Agent, or Firm* — NSIP Law

(57) ABSTRACT

A replay station and a method of operating the relay station in a multi-hop communication system are provided. A method of operating a relay station of a multi-hop communication system includes monitoring a delay of the relay station, determining whether the monitored delay exceeds a predetermined threshold, and controlling the relay station to be handed over to another upper relay station that is different from a connecting upper relay station.

9 Claims, 9 Drawing Sheets

RELAY STATION AND METHOD OF OPERATING RELAY STATION IN MULTI-HOP COMMUNICATION SYSTEM

CROSS-REFERENCE TO RELATED APPLICATION

This application claims the benefit under 35 U.S.C. §119(a) of a Korean Patent Application No. 2008-0031275, filed on Apr. 3, 2008 in the Korean Intellectual Property Office, the disclosure of which is incorporated herein by reference in its entirety.

TECHNICAL FIELD

The following description relates to a relay station and a communication system, and more particularly, to a relay station and a method of operating the relay station in a multi-hop communication system.

BACKGROUND

A number of multi-hop communication schemes of adding a relay station in existing base station-based communication systems have been provided to expand the coverage of the communication systems and improve the communication quality. A multi-hop communication scheme may provide for expansion of the base station coverage, simplicity of network configuration and installation, and improvement of the communication quality. Compared to existing systems, a cellular-based multi-hop communication system involves multi-hops between a user terminal and a base station, such as a mobile ad-hoc network (MANET) and a wireless sensor network (WSN). Generally, the cellular-based multi-hop communication system constitutes a tree-structured topology based on the base station.

A topology management may become an important issue in a multi-hop communication. For example, in a MANET, all the nodes joining the network may perform multi-hop communication through mutual cooperation. Therefore, management concerning forming, joining, leaving, partitioning, etc., of the topology may become important. Likewise, a topology management may become an issue in cellular-based multi-hop communication systems. The cellular-based multi-hop communication systems may improve the service quality associated with real-time services through the topology management. Accordingly, there is an increasing diversified need for a topology management in a multi-hop communication system.

SUMMARY

In one general aspect, there is provided a method of connecting a relay station with a multi-hop communication system and a method of managing a relay station in a multi-hop communication system that may improve the service quality associated with real-time services in a cellular-based multi-hop communication system.

In another general aspect, a relay station includes an information receiver to receive, from at least one upper relay station performing multi-hop communication with a base station, end-to-end delay information and hop-count information between the base station and the at least one upper relay station, a selector to select a connection target relay station from the at least one upper relay station based on the hop-count information and the end-to-end delay information, and a connection controller to control the relay station to connect with the connection target relay station.

The selector may select the base station as the connection target relay station where the relay station is within the coverage of the base station.

The selector may select, as the connection target relay station, an upper relay station with minimum hop counts to the base station, from the at least one upper relay station, and where at least two upper relay stations with the minimum hop counts exist, the selector may select, from the at least two upper relay stations with the minimum hop counts, an upper relay station with minimum end-to-end delay to the base station as the connection target relay station.

The relay station may further comprise an information generator to generate end-to-end delay information and hop-count information to the base station and a broadcasting unit to broadcast a broadcast message including the generated hop-count information and end-to-end delay information.

In still another general aspect, a relay station of a multi-hop communication system includes a delay monitoring unit to monitor a delay of the relay station, a decision unit to determine whether the monitored delay exceeds a predetermined threshold, and a handover controller to control one of the relay station or at least one lower relay station connecting with the relay station to be handed over to a connection target relay station where the monitored delay exceeds the threshold.

The delay may be an average queuing delay of the relay station.

Where at least one lower relay station is connected with the relay station, the handover controller may control the at least one lower relay station to be handed over to the connection target relay station, and where the at least one lower relay station is not connected with the relay station, the handover controller may control the relay station to be handed over to the connection target relay station.

The handover controller may further comprise a relative delay calculator to calculate a relative delay that each of the at least one lower relay station affects the relay station and a selector to select, from the at least one lower relay station, a lower relay station to be handed over to the connection target relay station based on the calculated relative delay.

The relative delay calculator may calculate the relative delay based on a bandwidth allocation ratio of each of the at least one lower relay station.

The selector may select, from the at least one lower relay station, at least one lower relay station with the relative delay greater than the difference between the monitored delay and the threshold, and the selector may select, from the selected at least one lower relay station, a lower relay station with the smallest relative delay as the lower relay station to be handed over to the connection target relay station.

The handover controller, while maintaining a connection state of at least one sub-lower relay station connecting in a lower layer of the at least one lower relay station, may control the at least one lower relay station to be handed over to the connection target relay station.

In still another general aspect, there is provided a relay station of a multi-hop communication system, including a state machine, wherein the state machine switches between a waiting state of receiving a signal from the multi-hop communication system for connection to the multi-hop communication system, a normal state of connecting with the multi-hop communication system to perform communication and monitor a delay of the relay station, and a control state of controlling the relay station to connect with the multi-hop communication system and controlling either the relay station or any one of at least one lower relay station connecting with the relay station to be handed over to a connection target relay station where the monitored delay exceeds a predetermined threshold.

In yet another general aspect, a method of operating a relay station of a multi-hop communication system includes monitoring a delay of the relay station, determining whether the monitored delay exceeds a predetermined threshold, and controlling the relay station to be handed over to another upper relay station that is different from a connecting upper relay station in response to the monitored delay exceeding the threshold.

The delay may be an average queuing delay of the relay station.

In yet another general aspect, a method of operating a relay station of a multi-hop communication system includes monitoring a delay of the relay station, determining whether the monitored delay exceeds a predetermined threshold, and controlling at least one lower relay station connecting with the relay station to be handed over to another relay station in response to the monitored delay exceeding the threshold.

The delay may be an average queuing delay of the relay station.

The controlling of the at least one lower relay station may comprise calculating a relative delay that each of the at least one lower relay station affects the relay station and selecting a target relay station to be handed over to the other relay station based on the relative delay.

The calculating of the relative delay may comprise calculating the relative delay based on a bandwidth allocation ratio of each of the at least one lower relay station.

The selecting of the target relay station may comprise selecting, from the at least one lower relay station, at least one lower relay station with the relative delay greater than the difference between the monitored delay and the threshold, and selecting, from the selected at least one lower relay station, a lower relay station with the smallest relative delay as the target relay station.

The controlling of the at least one lower relay station may comprise, while maintaining a connection state of at least one sub-lower relay station connecting in a lower layer of the at least one lower relay station, controlling the at least one lower relay station to be handed over to the another relay station.

Other features will become apparent to those skilled in the art from the following detailed description, which, taken in conjunction with the attached drawings, discloses exemplary embodiments of the invention

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, description of well-known functions and constructions are omitted to increase clarity and conciseness.

Figure 1:
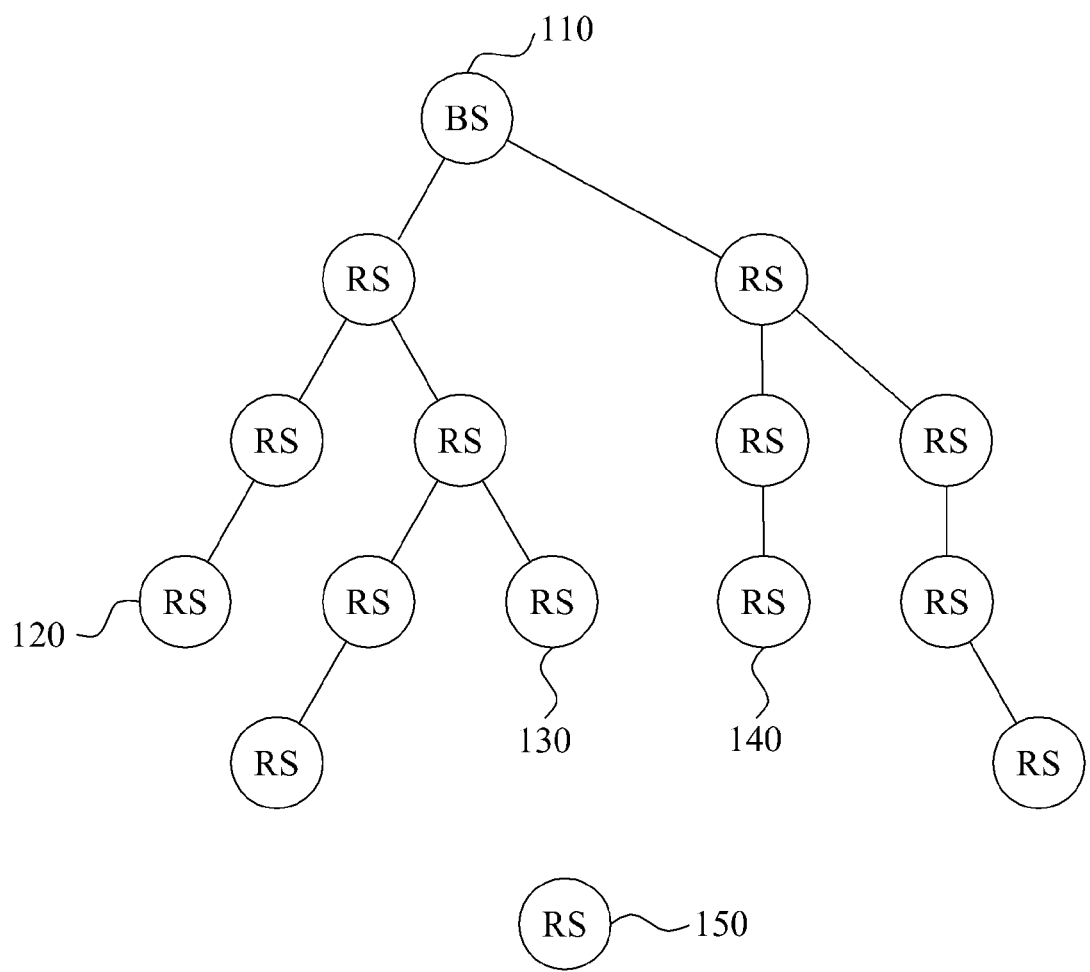
FIG. 1 is a configuration diagram illustrating a method of connecting a relay station with a multi-hop communication system according to an exemplary embodiment.

FIG. 1 illustrates a method of connecting a relay station (RS) 150 with a multi-hop communication system according to an exemplary embodiment.

Referring to FIG. 1, the relay station 150 may receive, from at least one upper relay station of the multi-hop communication system, end-to-end delay information and hop-count information between a base station 110 and the at least one upper relay station.

The relay station 150 may select, from the at least one upper relay station, a connection target relay station to be connected by the relay station 150 based on the hop-count information and the end-to-end delay information.

According to an aspect, where the relay station 150 is positioned within the coverage of the base station 110, the relay station 150 may be directly connected with the base station 110, instead of connecting with the upper relay station. In this case, the coverage may correspond to where a hop count between the base station 110 and the relay station 150 is "1".

Where the relay station 150 is positioned outside the coverage of the base station 110, the relay station 150 may be connected with the selected connection target relay station to connect with the multi-hop communication system. When selecting the connection target relay station, the relay station 150 may use the received hop-count information. The relay station 150 may select, as the connection target relay station, an upper relay station with minimum hop counts to the base station 110, from the at least one upper relay station.

In FIG. 1, three upper relay stations 120, 130, and 140 have minimum hop counts to the base station 110. However, this is only exemplary and it is not limited thereto. For example, where only a single upper relay station has the minimum hop counts to the base station 110, the relay station 150 may connect with the single upper relay station. Referring to FIG. 1, since there are at least two upper relay stations, that is, the upper relay stations 120, 130, and 140 with the minimum hop counts to the base station 110, the relay station 150 may select any one from the upper relay stations 120, 130, and 140. Therefore, the relay station 150 may select an upper relay station with minimum end-to-end delay based on end-to-end delay information received from the upper relay stations 120, 130, and 140 and connect with the selected upper relay station. For example, where the end-to-end delay of the upper relay station 140, among the upper relay stations 120, 130, and 140, is the minimum, the relay station 150 may select the upper relay station 140 as the connection target relay station and connect with the selected upper relay station 140.

Where the relay station 150 selects the connection target relay station to connect with the multi-hop communication system, the relay station 150 may generate end-to-end delay information and hop-count information between the base station 110 and the relay station 150, and for example, broadcast a broadcast message including the generated end-to-end delay information and hop-count information. The broadcast message may be used by another relay station to connect with the multi-hop communication system.

Figure 2:
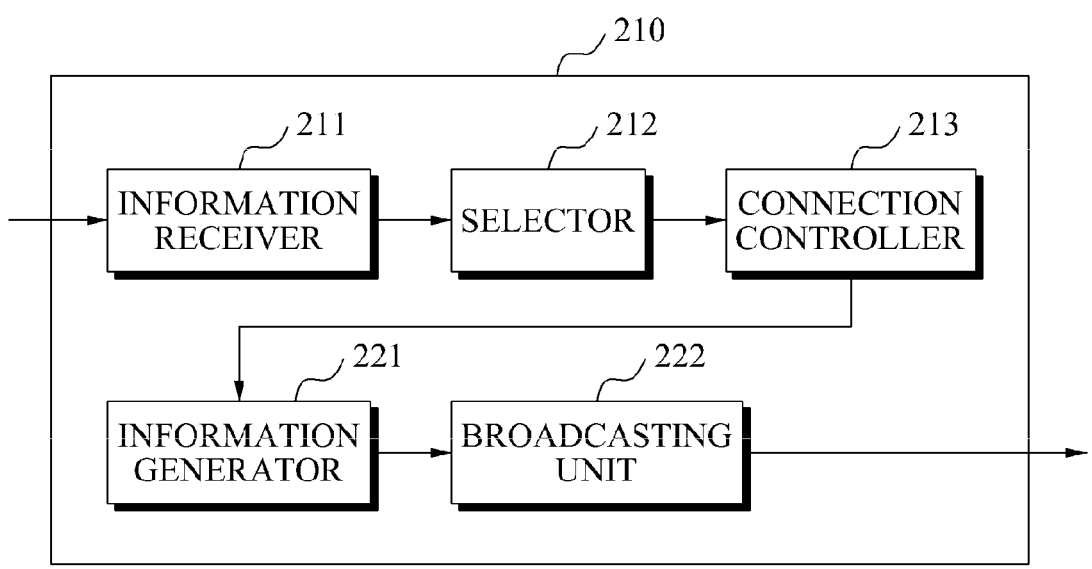
FIG. 2 is a block diagram illustrating a configuration of a relay station for connection to a multi-hop communication system according to an exemplary embodiment.

FIG. 2 illustrates a configuration of a relay station 210 for connection to a multi-hop communication system according to an exemplary embodiment.

As illustrated in FIG. 2, the relay station 210 comprises an information receiver 211, a selector 212, a connection controller 213, an information generator 221, and a broadcasting unit 222.

The information receiver 211 may receive, from at least one upper relay station performing multi-hop communication with a base station, end-to-end delay information and hop-count information between the base station and the at least one upper relay station.

The selector 212 may select, from the at least one upper relay station, a connection target relay station to be connected by the relay station 210, based on the hop-count information and the end-to-end delay information.

According to an aspect, where the relay station 210 is within the coverage of the base station, the selector 210 may select the base station as the connection target relay station, enabling the relay station 210 to connect with the base station.

According to an aspect, the selector 212 may select, from upper relay stations, an upper relay station with minimum hop counts to the base station, based on hop-count information received at the information receiver 211. Where there are at least two upper relay stations with the minimum hop counts, the selector 212 may select, from the at least two upper relay stations, an upper relay station with minimum end-to-end delay between the at least two upper relay stations and the base station, based on end-to-end delay information of the at least two upper relay stations.

The connection controller 213 may control the relay station 210 to connect with the selected connection target relay station.

Where the relay station 210 connects with the multi-hop communication system, the information generator 221 may generate end-to-end delay information and hop-count information between the relay station 210 and the base station, for, for example, another relay station's connection to the multi-hop communication system.

Figure 3:
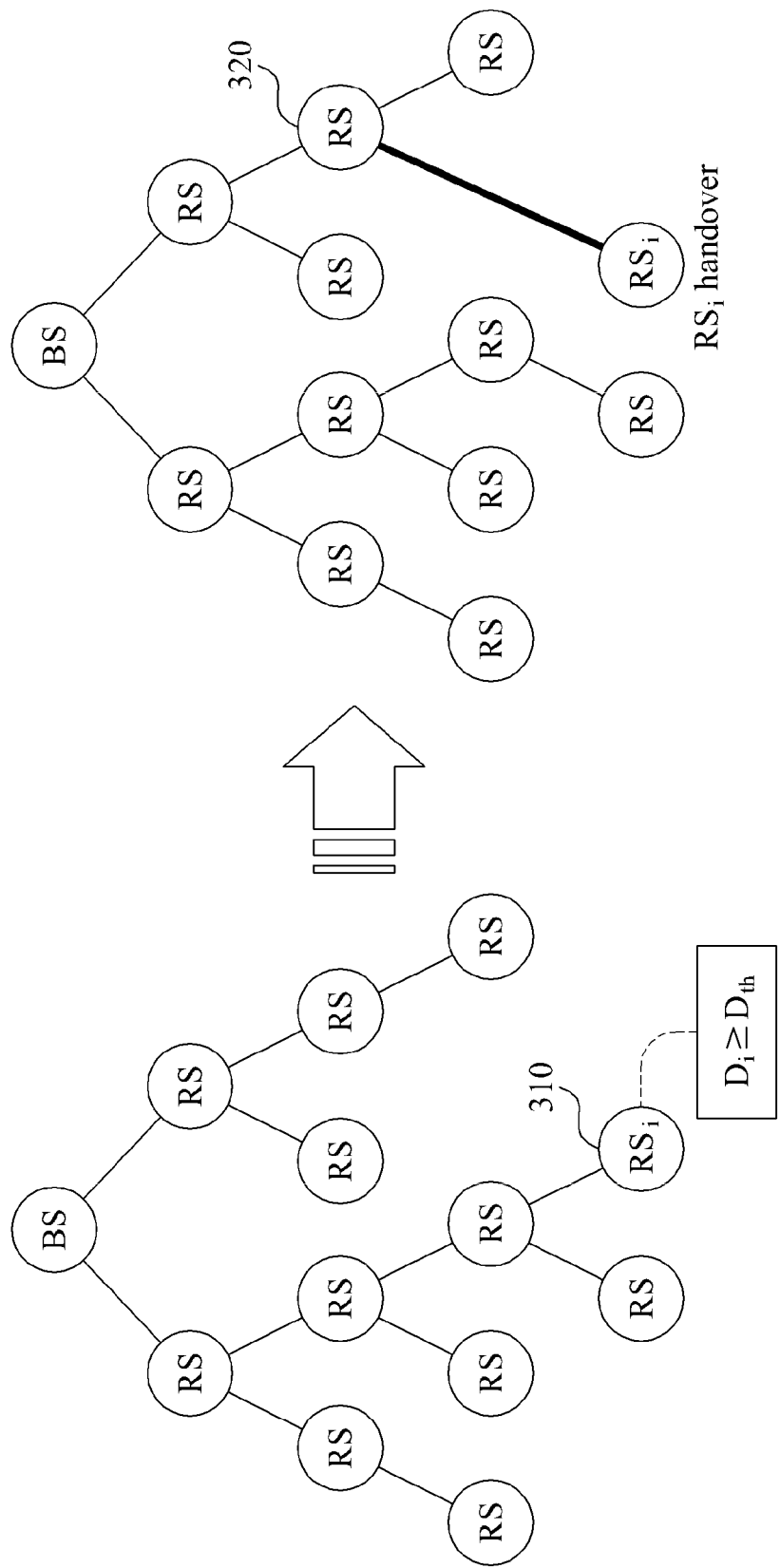
FIG. 3 is a configuration diagram illustrating an example of handing over a relay station of a multi-hop communication system to another relay station according to an exemplary embodiment.

The broadcasting unit 222 may broadcast a broadcasting message including the generated hop-count information and end-to-end delay information. FIG. 3 illustrates a method of handing over a relay station 310 of a multi-hop communication system to another relay station according to an exemplary embodiment.

Referring to FIG. 3, the relay station 310 monitors a delay in the multi-hop communication system and is handed over to a connection target relay station 320 where the monitored delay exceeds a predetermined threshold.

Generally, among various types of delays that packets with multi-hop transmission paths may go through, queuing delay may be a largest portion. The queuing delay that a packet experiences in a particular queue of the relay station 310 may be calculated by marking the packet with a timestamp corresponding to current time information, where the packet enters the particular queue, and by using the marked information where the packet leaves the particular queue. Based thereon, an average queuing delay may be expressed as, $$\overline{D_i(k)} = \alpha \times \overline{D_i(k-1)} + (1-\alpha) \times D_i(k) \qquad \text{[Equation 1]}$$

Here, $D_i(k)$ is a $k^{th}$ calculated queuing delay of the relay station 310 and is added up to $\overline{D_i(k-1)}$ corresponding to the average queuing delay up to a previous value. Therefore, the average queuing delay of up to now may be expressed. $\alpha$ is a prime number between 0 and 1. When calculating $D_i(k)$ by linearly combining queuing delay measured in an uplink queue and queuing delay measured in a downlink queue, bi-directionally considered queuing delay may be calculated, which may be expressed as, $$D_i(k) = \beta \times \overline{D_{i,up}(k)} + (1-\beta) \times \overline{D_{i,down}(k)}, 0 \leq \beta \leq 1 \qquad \text{[Equation 2]}$$

where $\beta$ is a constant between 0 and 1 to indicate the uplink ratio.

According to an aspect, the relay station 310 may monitor the calculated average queuing delay of Equation 2 to determine whether the calculated average queuing delay exceeds the threshold. Where the average queuing delay is greater than the threshold, the relay station 310 may be handed over to the connection target relay station 320. With the queuing delay of the relay station 310 exceeding the threshold, a transmission channel of the relay station 310 may have a poor state, or a signal-to-noise ratio (SNR) of the channel may be bad. Therefore, where the queuing delay exceeds the threshold, the relay station 310 may have an improved channel state through handover to the connection target relay station 320, which is different from the connecting upper relay. Where the relay station 320 is handed over to the connection target relay station 320, but the queuing delay of the relay station 310 is still greater than the threshold, the relay station 310 may iteratively perform the handover process to another third relay station different from the connection target relay station 320. According to an aspect, the relay station 310 performing the handover process may be one connected at an end of the multi-hop communication system.

Figure 4:
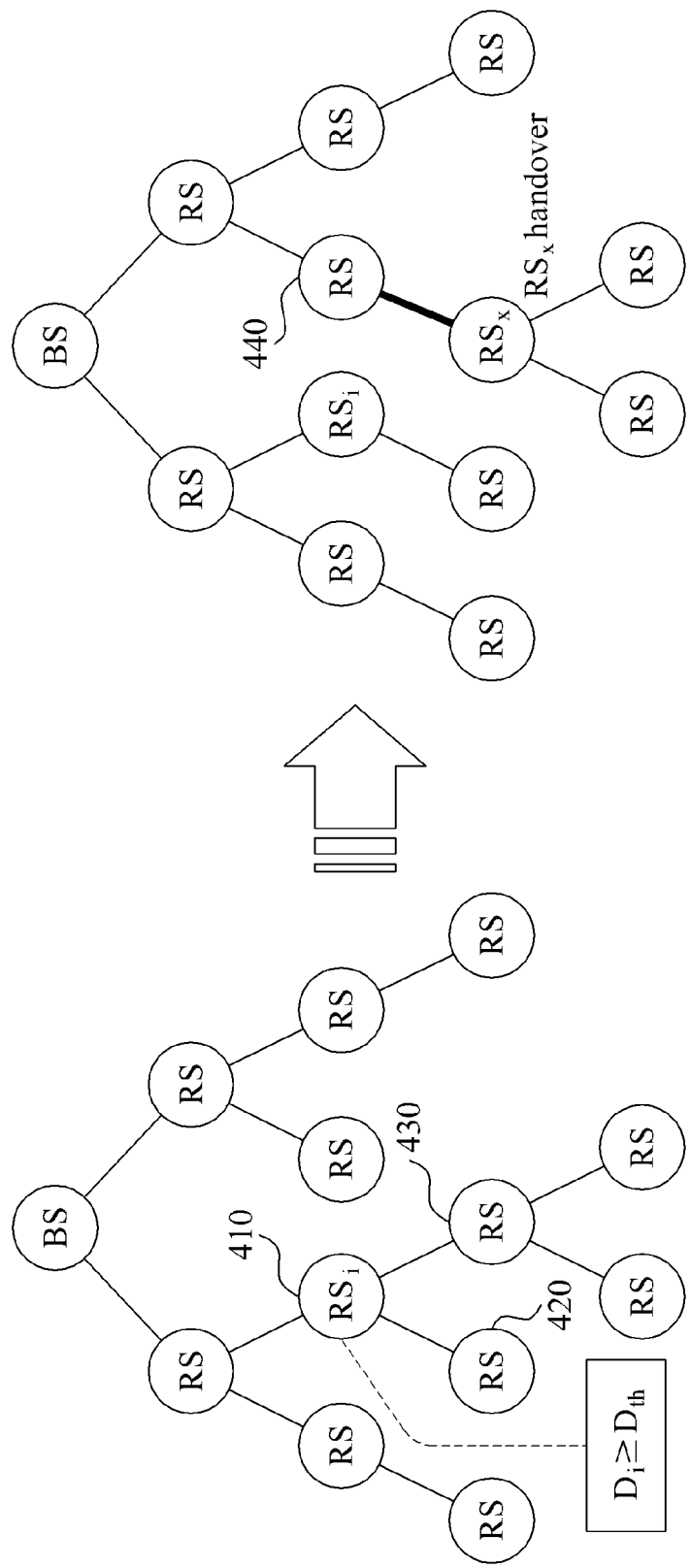
FIG. 4 is a configuration diagram illustrating a method of controlling a relay station of a multi-hop communication system to hand over a lower relay station according to an exemplary embodiment.

FIG. 4 illustrates a method of controlling a relay station 410 of a multi-hop communication system to hand over a lower relay station according to an exemplary embodiment.

Referring to FIG. 4, the relay station 410 selects any one lower relay station, for example, 430 from at least one lower relay station, for example, lower relay stations 420 and 430 connected in a lower layer of the relay station 410, and controls the selected lower relay station 430 to be handed over to a connection target relay station 440.

The relay station 410 may monitor the average queuing delay that may be calculated according to Equation 2. Where the queuing delay exceeds a predetermined threshold, the relay station 410 may select any one of the lower relay stations 420 and 430 connected in the lower layer of the relay station 410 and control the selected lower relay station to be handed over to the connection target relay station 440. In the exemplary case of FIG. 4, the lower relay station 430 is selected to be handed over to the connection target relay station 440.

Hereinafter, a process of selecting, by the relay station 410, the lower relay station 430 from the lower relay stations 420 and 430 will be further described.

The relay station 410 may select a handover target relay station based on relative delay that each of the lower relay stations 420 and 430 affects the relay station 410. The relative delay may be calculated based on a bandwidth allocation ratio of each of the lower relay stations 420 and 430. Generally, as the bandwidth allocated to the lower relay stations 420 and 430 increases, the greater effect of the queuing delay may be on the relay station 410. Therefore, when dividing each bandwidth allocated to the lower relay stations 420 and 430 by the entire bandwidth, it may be possible to calculate the ratio of the queuing delay that each of the lower relay stations 420 and 430 affects the relay station 410. Since the relay station 410 includes both uplink and downlink bandwidth allocation information in association with the lower relay stations 420 and 430, the ratio may be calculated. When multiplying the calculated ratio by the queuing delay of the relay station 410 that may be calculated according to Equation 2, it may be possible to calculate the queuing delay that each of the lower relay stations 420 and 430 affects the relay station 410, which may be expressed as, $$\left(\beta \times \overline{D_{i,up}} \times \frac{BW_{up}(x)}{\sum_{y \in C} BW_{up}(y)}\right) + \qquad \text{[Equation 3]}$$

$$\left((1-\beta) \times \overline{D_{i,down}} \times \frac{BW_{down}(x)}{\sum_{y \in C} BW_{down}(y)}\right).$$

The relay station 410 may select, as the handover target relay station, a lower relay station with the relative delay greater than the difference between the queuing delay of the relay station 410 and the threshold. This is to hand over, to the connection target relay station 440, the lower relay station with the relative delay greater than the difference between the queuing delay and the threshold, so as to reduce the queuing delay of the relay station 410 down to less than the threshold.

Where at least two lower relay stations are selected during the selection process, the relay station 410 may select a single lower relay station with the smallest queuing delay that each of the at least two lower relay stations affects the relay station 410 and hand over the selected lower relay station to the connection target relay station 440. This is to minimize loads to the connection target relay station 440 while the lower relay station is being handed over from the relay station 410 to the connection target relay station 440. However, this is only exemplary and it is not limited thereto.

The above-described process of selecting, by the relay station 410, the target relay station to be handed over to the connection target relay station 440 may be expressed as, $$\underset{x \in C}{\text{argmin}}\left\{\left(\beta \times \overline{D_{i,up}} \times \frac{BW_{up}(x)}{\sum_{y \in C} BW_{up}(y)}\right) + \qquad \text{[Equation 4]}\right.$$

$$\left.\left((1-\beta) \times \overline{D_{i,down}} \times \frac{BW_{down}(x)}{\sum_{y \in C} BW_{down}(y)}\right)\right\} \geq (\overline{D_i} - D_{th})$$

C: set of child RSs of $RS_i$ $BW_{up/down}(x)$: amount of allocated BW for uplink/downlink of $RS_x$.

According to an aspect, where the relay station 410 controls the lower relay station 430 to hand over to the connection target relay station 440, the relay station 410 may hand over the lower relay station 430 to the connection target relay station 440, while maintaining a connection state of sub-lower relay stations connected in a lower layer of the lower relay station 430.

Figure 5:
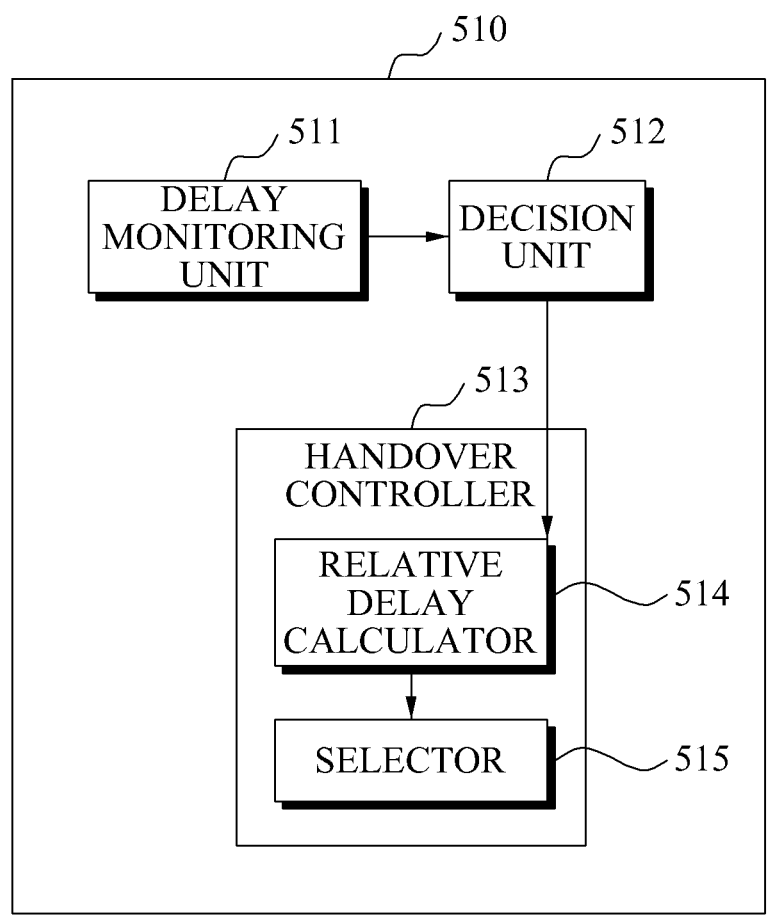
FIG. 5 is a block diagram illustrating a configuration of a relay station of a multi-hop communication system according to an exemplary embodiment.

FIG. 5 illustrates a configuration of a relay station 510 of a multi-hop communication system according to an exemplary embodiment.

As illustrated in FIG. 5, the relay station 510 comprises a delay monitoring unit 511, a decision unit 512, and a handover controller 513.

The delay monitoring unit 511 may monitor a delay of the relay station 510. According to an aspect, the delay may become the average queuing delay that may be expressed according to Equation 2.

The decision unit 512 may determine whether the monitored delay exceeds a predetermined threshold.

Where it is determined that the monitored delay is greater than the threshold, the handover controller 513 may control the relay station 510 to be handed over to a connection target relay station. Where at least one lower relay station is connected with the relay station 510, the handover controller 513 may control any one of the at least one lower relay station to be handed over to the connection target relay station. According to an aspect, where the relay station 510 is connected at an end of the multi-hop communication system, the handover controller 513 may control the relay station 510 to be handed over to another upper relay station different from its connecting upper relay station. Where at least one lower relay station is connected with the relay station 510, the handover controller 513 may select any one from the at least one lower relay station and control the selected lower relay station to be handed over to a connection target relay station different from the relay station 510.

According to an aspect, while maintaining a connection state of at least one sub-lower relay station connected with the lower layer of the at least one lower relay station, the handover controller 513 may control the at least one lower relay station to be handed over to the connection target relay station.

The handover controller 513 may include a relative delay calculator 514 and a selector 515.

Where at least one lower relay station is connected with the relay station 510, the relative delay calculator 514 may calculate a relative delay that each of the at least one lower relay station affects the relay station 510, based on the bandwidth allocation ratio of the at least one lower relay station. The relative delay may be calculated according to Equation 3.

The selector 515 may select, from the at least one lower relay station, a lower relay station to be handed over to the connection target relay station based on the calculated relative delay.

According to an aspect, the selector 515 may select, from the at least one lower relay station, at least one lower relay station with the relative delay greater than the difference between the delay of the relay station 510 and the threshold. Also, the selector 515 may select, from the selected at least one lower relay station, a lower relay station with the smallest relative delay as a lower relay station to be handed over to the connection target relay station. The selector 515 may select a lower relay station satisfying Equation 4 to be handed over to the connection target relay station.

Figure 6:
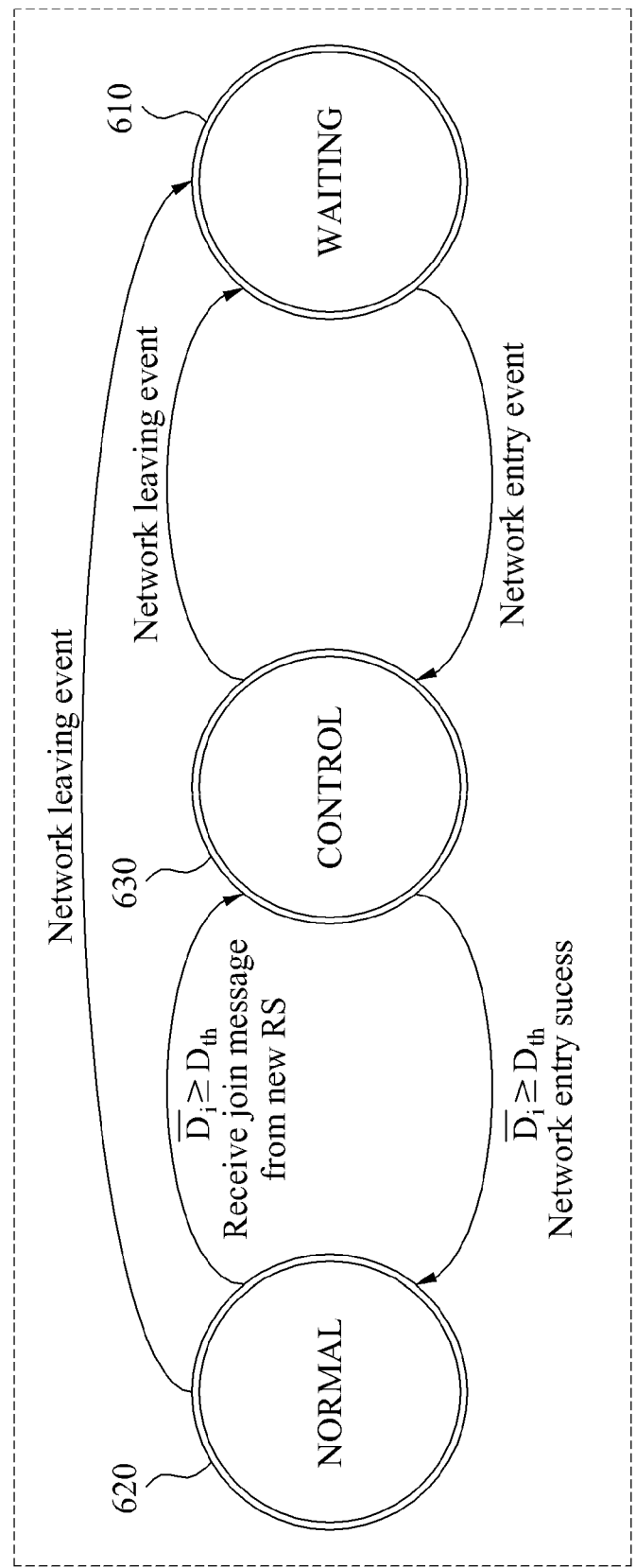
FIG. 6 is a diagram illustrating a switching state of a state machine of a relay station according to an exemplary embodiment.

FIG. 6 illustrates a switching state of a state machine of a relay station according to an exemplary embodiment.

Referring to FIG. 6, the switching state of the state machine may include a waiting state 610, a normal state 620, and a control state 630.

In the waiting state 610, the relay station waits for reception of a signal from a multi-hop communication system in order to connect with the multi-hop communication system, before the relay station is connected with the multi-hop communication system.

Where the relay station receives a signal from the multi-hop communication system to normally connect with the multi-hop communication system in the waiting state 610, the relay station performs normal multi-hop communication and monitors whether a delay of the relay station exceeds a predetermined threshold in the normal state 620.

In the control state 630, the relay station of the waiting state 610 is controlled to connect with the multi-hop communication system. Also, in the control state 630, where the monitored delay of the relay station in the normal state 620 exceeds the threshold, the relay station is controlled to be handed over to another upper relay station different from its connecting upper relay station, or controls the at least one lower relay station connected with the relay station to be handed over to another relay station different from the relay station.

Figure 7:
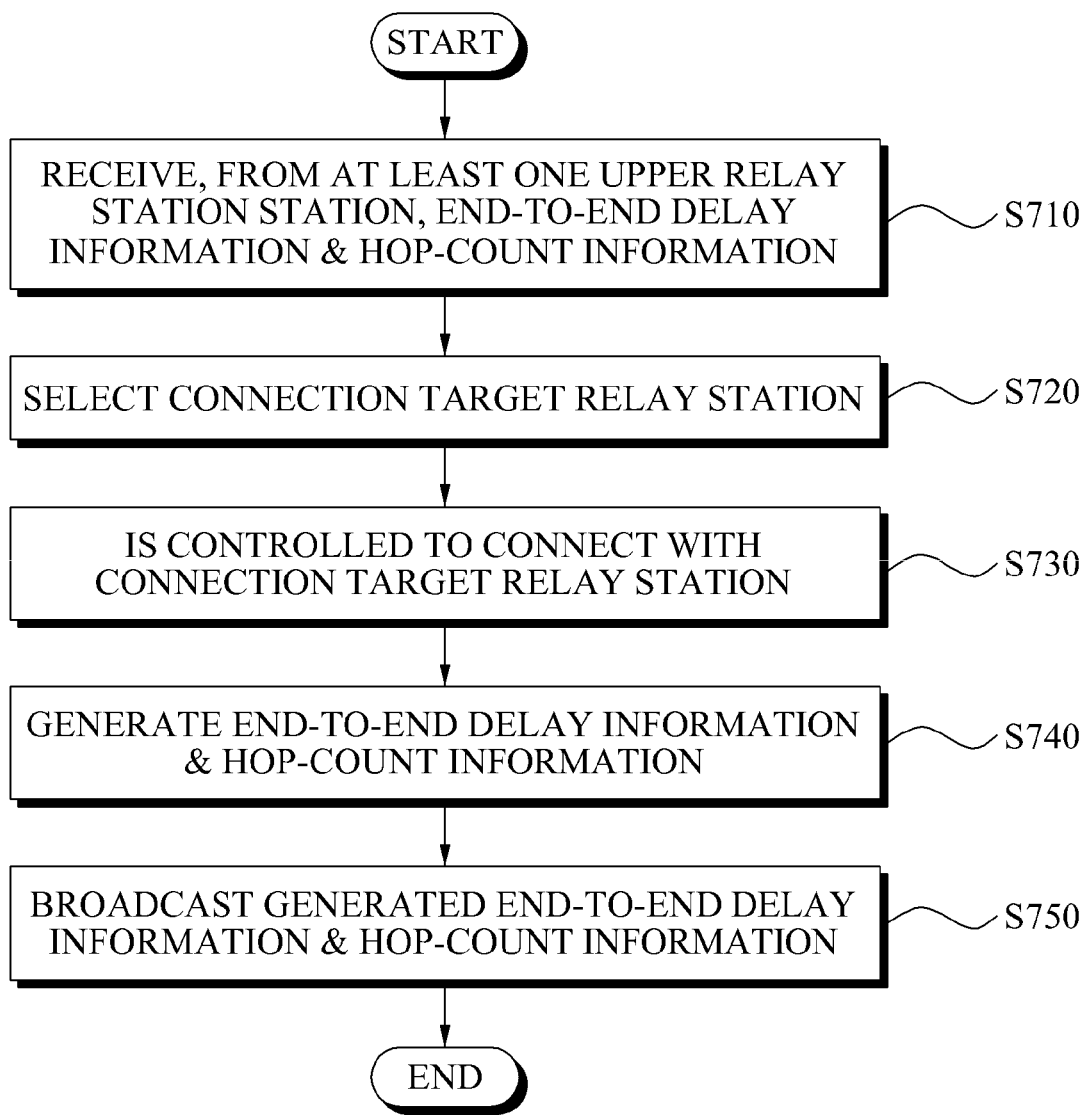
FIG. 7 is a flowchart illustrating a process for connecting a relay station with a multi-hop communication system according to an exemplary embodiment.

FIG. 7 illustrates a process in which a relay station is connected with a multi-hop communication system according to an exemplary embodiment. In operation S710, the relay station receives, from at least one upper relay station performing multi-hop communication with a base station, end-to-end delay information and hop-count information between the base station and the at least one upper relay station.

In operation S720, the relay station selects a connection target relay station to be connected by the relay station based on the end-to-end delay information and the hop-count information.

According to an aspect, where the relay station is within the coverage of the base station, the base station may be selected as the connection target relay station.

According to an aspect, in the operation S720, the relay station may select, as the connection target relay station, an upper relay station with minimum hop counts. Where there are at least two upper relay stations with the minimum hop counts, the relay station may select, from the at least two upper relay stations, an upper relay station with minimum end-to-end delay as the connection target relay station.

In operation S730, the relay station is controlled to connect with the selected connection target relay station.

In operation S740, the relay station generates end-to-end delay information and hop-count information between the relay station and the base station.

In operation S750, the relay station broadcasts a broadcast message including the generated end-to-end delay information and hop-count information.

Figure 8:
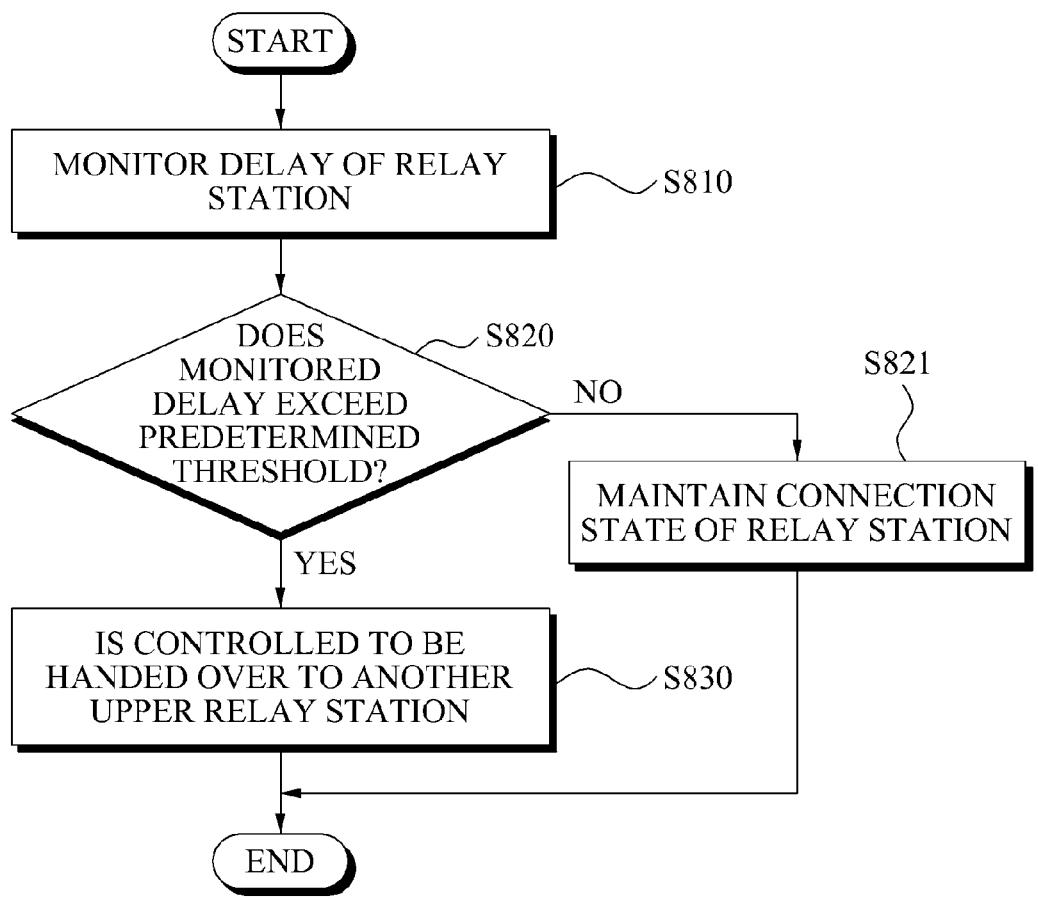
FIG. 8 is a flowchart illustrating a process in which a relay station of a multi-hop communication system is handed over to another relay station according to an exemplary embodiment.

FIG. 8 illustrates a process in which a relay station of a multi-hop communication system is handed over to another relay station according to an exemplary embodiment. According to an aspect, the process may be performed at a relay station connected in an end of the multi-hop communication system.

In operation S810, the relay station monitors a delay of the relay station. The delay may be the average queuing delay that may be expressed according to Equation 2.

In operation S820, the relay station determines whether the monitored delay exceeds a predetermined threshold.

Unless the monitored delay exceeds the threshold, the connection state of the relay station may be maintained as is in operation S821.

Where the monitored delay exceeds the threshold, the relay station is controlled to be handed over to another upper relay station different from its connecting upper relay station in operation S830.

Figure 9:
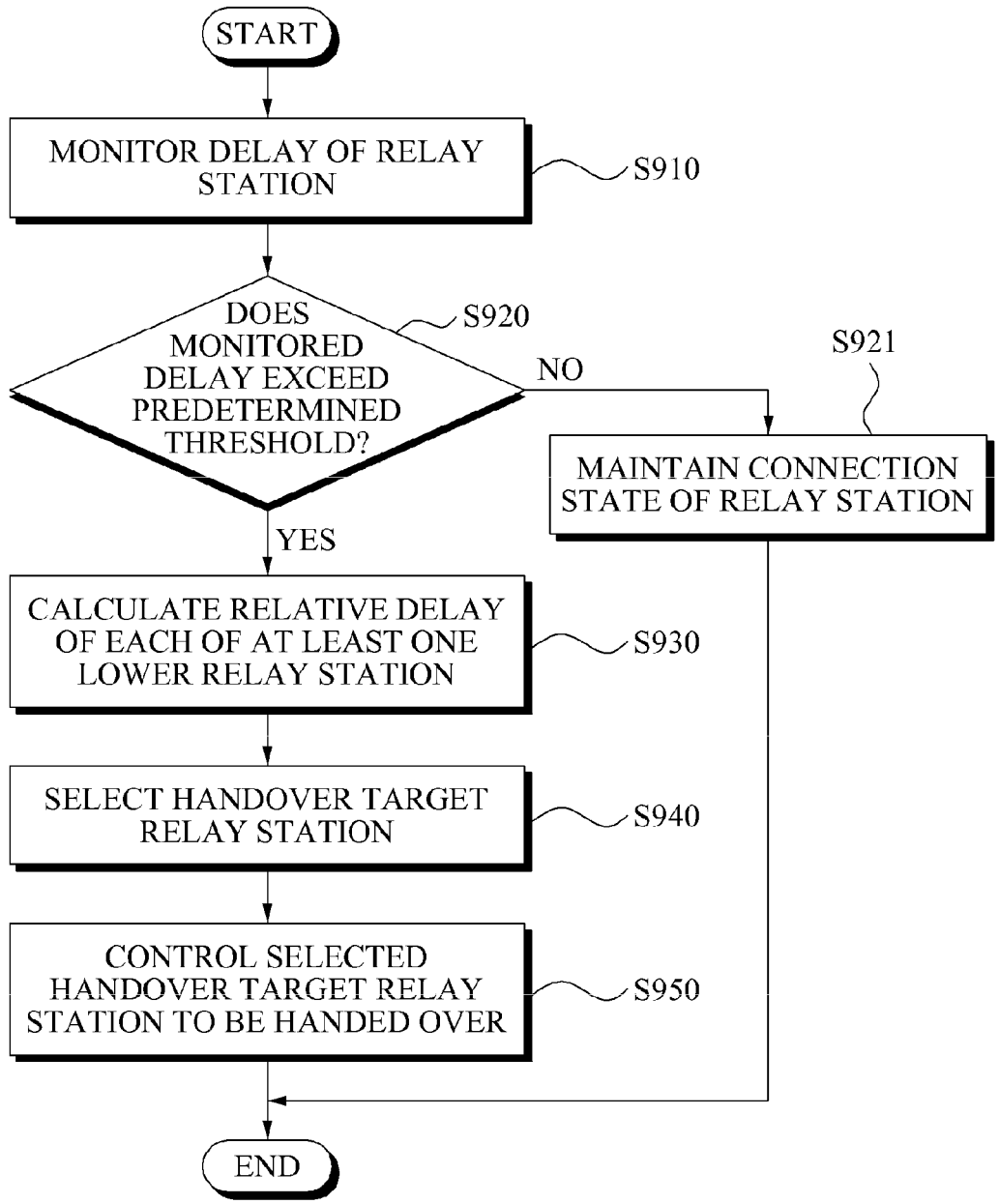
FIG. 9 is a flowchart illustrating a process of controlling a relay station of a multi-hop communication system to hand over a lower relay station according to an exemplary embodiment.

FIG. 9 illustrates a process of controlling a relay station of a multi-hop communication system to hand over a lower relay station according to an exemplary embodiment.

According to an aspect, the relay station performing the process may be connected with at least one lower relay station in a lower end of the relay station.

In operation S910, the relay station monitors a delay of the relay station. The delay may be the average queuing delay that may be expressed according to Equation 2.

In operation S920, the relay station determines whether the monitored delay exceeds a predetermined threshold.

Unless the monitored delay exceeds the threshold, the connection state of the relay station may be maintained as is in operation S921.

Where the monitored delay exceeds the threshold, the relay station calculates a relative delay that each of the at least one lower relay station connected with the relay station affects the relay station.

According to an aspect, the relative delay of the at least one lower relay station may be calculated based on the bandwidth allocation ratio of each lower relay station, which may be expressed as the above Equation 3.

In operation S940, the relay station selects a handover target relay station based on the calculated relative delay.

According to an aspect, in the operation S940, the relay station may select, from the at least one lower relay station, at least one lower relay station with the relative delay greater than the difference between the monitored delay of the operation S910 and the threshold. Where at least two lower relay stations are selected, the relay station may select, from the selected two lower relays, a lower relay station with the smallest relative delay as a handover target relay station. Specifically, the lower relay station satisfying Equation 4 may be selected. Again, this is only exemplary and it is not limited thereto.

In operation S950, the relay station controls the selected handover target relay station to be handed over to the connection target relay station.

According to an aspect, in the operation S950, where at least one sub-lower relay station is connected with the selected handover target relay station, the relay station may control the selected handover target relay station to be handed over to the connection target relay station while maintaining the connection state of the at least one sub-lower relay station.

The methods and operations described above including the exemplary relay station operating method may be recorded, or fixed in one or more computer-readable media that includes program instructions to be implemented by a computer to case a processor to execute or perform the program instructions. The media may also include, independent or in combination with the program instructions, data files, data structures, and the like. Examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and/or methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A relay station of a multi-hop communication system, comprising:
   a delay monitoring unit configured to monitor a delay of the relay station;
   a decision unit configured to determine whether the monitored delay exceeds a predetermined threshold; and
   a handover controller configured to control and select the relay station or at least one lower relay station connecting with the relay station to be handed over to a connection target relay station where the monitored delay exceeds the threshold,
   wherein the handover controller comprises
      a relative delay calculator configured to calculate a relative delay of each of the at least one lower relay station based on a bandwidth allocation ratio of each of the at least one lower relay station, and
      a selector configured to select, from the at least one lower relay station, a lower relay station to be handed over to the connection target relay station based on the calculated relative delay.

2. The relay station as claimed in claim 1, wherein the delay is an average queuing delay of the relay station.

3. The relay station as claimed in claim 1, wherein:
   where the at least one lower relay station is connected with the relay station, the handover controller is further configured to control the at least one lower relay station to be handed over to the connection target relay station; and
   where the at least one lower relay station is not connected with the relay station, the handover controller is further configured to control the relay station to be handed over to the connection target relay station.

4. The relay station as claimed in claim 1, wherein the selector is further configured to select, from the at least one lower relay station, the lower relay station with the relative delay greater than a difference between the monitored delay and the threshold, and with the smallest relative delay, to be handed over to the connection target relay station.

5. The relay station as claimed in claim 1, wherein the handover controller, while maintaining a connection state of at least one sub-lower relay station connecting in a lower layer of the at least one lower relay station, is further configured to control the at least one lower relay station to be handed over to the connection target relay station.

6. A method of operating a relay station of a multi-hop communication system, the method comprising:
   monitoring a delay of the relay station;
   determining whether the monitored delay exceeds a predetermined threshold; and
   in response to the monitored delay exceeding the threshold, controlling and selecting at least one lower relay station connecting with the relay station to be handed over to another relay station,
   wherein the controlling and the selecting of the at least one lower relay station comprises
      calculating a relative delay of each of the at least one lower relay station based on a bandwidth allocation ratio of each of the at least one lower relay station, and
      selecting, from the at least one lower relay station, a lower relay station to be handed over to the other relay station based on the calculated relative delay.

7. The method as claimed in claim 6, wherein the delay is an average queuing delay of the relay station.

8. The method as claimed in claim 6, wherein the selecting of the lower relay station comprises selecting, from the at least one lower relay station, the lower relay station with the relative delay greater than a difference between the monitored delay and the threshold, and with the smallest relative delay, to be handed over to the other relay station.

9. The method as claimed in claim 6, wherein the controlling of the at least one lower relay station comprises, while maintaining a connection state of at least one sub-lower relay station connecting in a lower layer of the at least one lower relay station, controlling the at least one lower relay station to be handed over to the another relay station.

\* \* \* \* \*